(12) United States Patent
Zien

(10) Patent No.: US 6,864,860 B1
(45) Date of Patent: Mar. 8, 2005

(54) SYSTEM FOR DOWNLOADING DATA USING VIDEO

(75) Inventor: Jason Yeong Zien, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/233,603

(22) Filed: Jan. 19, 1999

(51) Int. Cl.$^7$ ................................................ G09G 5/00
(52) U.S. Cl. .................... 345/1.2; 345/2.1; 345/156; 348/207.99
(58) Field of Search ................... 345/43, 326, 327, 345/180, 207, 6, 1–3, 10, 11, 156–158, 169, 1.1, 1.2, 2.1–2.3; 707/26, 27, 201, 204; 348/207.1, 207.99, 211.3, 222.1, 61, 552; 708/111

(56) References Cited

U.S. PATENT DOCUMENTS

| | | | |
|---|---|---|---|
| 4,999,617 A | 3/1991 | Uemura et al. | 340/706 |
| 5,153,928 A | 10/1992 | Iizuka | 382/65 |
| 5,488,571 A | 1/1996 | Jacobs et al. | 364/705.07 |
| 5,535,147 A | 7/1996 | Jacobs et al. | 364/705.07 |
| 5,570,297 A | 10/1996 | Brzezinski et al. | 364/514 R |
| 5,652,602 A | 7/1997 | Fishman et al. | 345/156 |
| 5,778,011 A | 7/1998 | Blaum et al. | 371/37.4 |
| 5,815,127 A * | 9/1998 | Jacobs et al. | 345/1 |
| 5,831,664 A * | 11/1998 | Wharton et al. | 345/1 |
| 5,857,193 A * | 1/1999 | Sutcliffe et al. | 707/10 |
| 5,892,509 A * | 4/1999 | Jacobs et al. | 345/1 |
| 5,917,464 A * | 6/1999 | Stearns | 345/87 |
| 6,144,375 A * | 11/2000 | Jain et al. | 345/302 |

* cited by examiner

Primary Examiner—Regina Liang
(74) Attorney, Agent, or Firm—Gates & Cooper LLP

(57) ABSTRACT

A system for synchronizing data between two devices. A first device displays a data stream as a sequence of one or more two-dimensional frames on a video screen attached thereto, wherein each of the two-dimensional frames is comprised of at least one two-dimensional shape of varying color that represents at least one data element within the data stream. A second device having an image sensing device coupled thereto captures images from the displayed sequence of two-dimensional frames and for decodes the data elements from the captured images.

34 Claims, 6 Drawing Sheets

SYSTEM FOR DOWNLOADING DATA USING VIDEO

BACKGROUND OF THE INVENTION

1. Field of the Invention

The present invention generally relates to applications involving the Internet, and in particular, to a system for downloading data using video over wide area networks such as the Internet.

2. Description of Related Art

There are several important trends occurring in computing. First, processor speeds are consistently increasing at an exponential rate. Second, computers are progressively advancing to ever smaller form factors. It is apparent that we will soon be entering the age of the wearable computer and the ubiquitous portable digital device. These are computers that will be small and convenient enough to carry around all day. Already, there are products moving toward that goal, including Windows CE devices, the Palm Pilot, "smart" cell phones, and more.

Portable devices are meant to augment laptop, desktop and/or network computing systems. They allow the user to carry around important information, such as email, meeting schedules, contact lists, and more. Such small form-factor devices, while convenient to carry, are often very inconvenient when it comes to uploading and/or downloading data.

Information is often synchronized (e.g., downloaded into the portable device and/or uploaded into the desktop computer) by a serial connection to the desktop computer, or by a modem connection, or by an Ethernet connection. Yet another method for downloading data is exemplified by the Timex DataLink watch.

In the Timex DataLink watch, as described in U.S. Pat. Nos. 5,652,602, 5,488,571, and 5,535,147, data is downloaded to the watch by means of a video screen controlled by a desktop computer running the special DataLink software. The watch includes a single photosensor that receives data via a serial protocol through the light pattern generated by the video monitor.

Other related techniques can be found in a number of patents. U.S. Pat. No. 5,778,011 describes a method for writing and protecting against random and cluster errors in image blocks. U.S. Pat. No. 5,570,297 is concerned with the synchronization of data through video by varying the rate of pulses and using an audible signal for signaling a complete transfer. U.S. Pat. No. 5,153,928 describes a method for recording and reproducing mesh pattern data. U.S. Pat. No. 4,999,617 describes a physical device constructed which attaches to a screen via a suction cup and contains a photosensor for detecting light on a screen.

Notwithstanding these various innovations, there is still a need in the art for improved methods of synchronizing portable devices with desktop computers or server computers. More specifically, there is a need for an improved, yet simple and effective, transmission mechanism for such synchronization methods.

SUMMARY OF THE INVENTION

To overcome the limitations in the prior art described above, and to overcome other limitations that will become apparent upon reading and understanding the present specification, the present invention discloses a system for synchronizing data between two devices. A first device displays a data stream as a sequence of one or more two-dimensional frames on a video screen attached thereto, wherein each of the two-dimensional frames is comprised of at least one two-dimensional shape of varying color that represents at least one data element within the data stream. A second device having an image sensing device coupled thereto captures images from the displayed sequence of two-dimensional frames and decodes the data elements from the captured images.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

The present invention describes a system for synchronizing data between a portable device and a desktop computer and/or server computer. According to the preferred embodiment of the present invention, the portable device can downsync (downloading by synchronizing uni-directionally) from any network-attached device, such as through a client computer having a web browser. The portable device is video-enabled, using a video camera, inexpensive digital CMOS image sensors, or other image sensing mechanism, so that an entire video screen of the network-attached device can be captured during the downsync, rather than just a serial data stream. Moreover, encryption is used during downsync to ensure the security and privacy of the downsync data stream.

Hardware Environment

Figure 1:
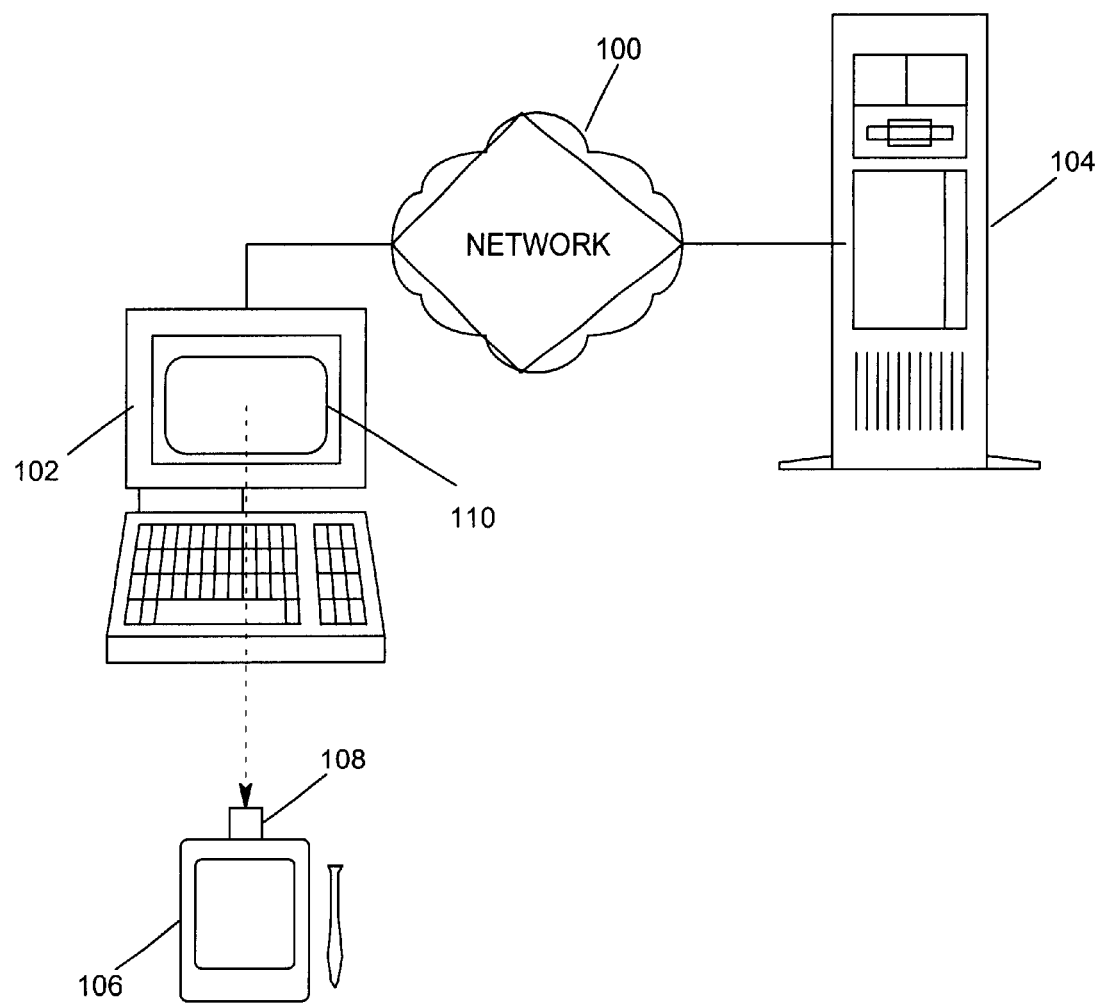
FIG. 1 schematically illustrates an exemplary hardware environment used in the preferred embodiment of the present invention.

FIG. 1 schematically illustrates an exemplary hardware environment that could be used in the preferred embodiment of the present invention. The exemplary environment is comprised of a network 100 that connects one or more client computers 102 to one or more server computers 104. Moreover, a portable device 106 connects to one of the client computers 102 in order to synchronize itself with data reposing either on the client computer 102 or one of the server computers 104. A typical combination of resources may include client computers 102 that comprise network computer, laptops, personal computers, workstations, kiosks, interactive TV systems, etc.; server computers 104 that comprise personal computers, workstations, minicomputers, mainframes, etc.; and portable devices 106 that comprise personal digital assistants (PDAs), laptop computers, processor-enabled cell phones, etc. The network 100 connecting these computers may comprise the Internet, an Intranet, an Extranet, a wide area network, a local area network, a direct link between computers, and any other type of wired or wireless networks.

Thus, the present invention may be implemented as a method, apparatus, or article of manufacture using standard programming and/or engineering techniques to produce software, firmware, hardware, or any combination thereof. The term "article of manufacture" (or alternatively, "computer program carrier or product") as used herein is intended to encompass one or more computer programs accessible from any device, medium, or carrier.

Of course, those skilled in the art will recognize that the exemplary environment illustrated in FIG. 1 is not intended to limit the present invention. For example, the functions of the server computer 104 could be performed by multiple server computers 104. Moreover, a client/server architecture is not required, and the present invention could be completed using a single computer, such as a workstation, for connection to the portable device 106. Indeed, those skilled in the art will recognize that other alternative hardware environments may be used without departing from the scope of the present invention.

Operation of the Invention

In a preferred embodiment of the present invention, the portable device 106 downsyncs from a network-connected client computer 102 having a standalone program, such as a web browser. The portable device 106 includes an attached video camera 108, so that an entire video screen 110 of the client computer 102 can be captured during the downsync.

According to the preferred embodiment of the present invention, one way to encode data visually on the video screen 110 of the client computer 102 is to represent bits of data using pixels. In addition, colors can be used, so that each pixel can represent multiple values. However, unless the digital camera 108 of the portable device 106 has extremely high resolution, it is more realistic to use groups of pixels to represent bits of data.

In one embodiment, the portable device 106 has a video camera 108 with a 640×480 resolution, as does the video screen 110 of the client computer 102. The portable device 106 is positioned some distance from the video screen 110 of the client computer 102 and it is unlikely that the camera 108 will be perfectly aligned such that there is an exact pixel-to-pixel correspondence. If the portable device 106 is being handled or worn in this embodiment, it is unlikely that the camera 108 will remain still during the transfer and thus some motion blur is assumed. The net result of compensating for the aforementioned conditions is to represent each data element with an 8×8 grid of pixels in this embodiment. Of course, other embodiments may use other representations without departing from the scope of this invention.

Using a conservative approach in this embodiment, each piece of information or data element is represented on the video screen 110 using extremes in RGB values. As is well known in the art, a video subsystem in a computer typically uses one or more palettes (e.g., application, system, and hardware palettes) for displaying colors on the video screen 110 of the client computer 102. Each palette comprises one or more entries, wherein each entry is identified by an index value and contains three color fields corresponding to the Red, Green, and Blue (RGB) color values between 0 and 255 are used to create a desired color represented by that entry. In this embodiment, for example, only four colors may be used, e.g., black (0x000000), red (0xff0000), green (0x00ff00) and blue (0x0000ff) using standard encoding techniques. In this conservative approach, two bits of information are encoded per pixel, thereby resulting in a total of 80×60×2 bits=19200 bits, or 2400 bytes.

Bit errors are likely, perhaps due to smudges on the video screen 110, the camera 108 lens, bad pixels, bleeding colors, etc. As a result, the data may be wrapped into a Hamming code that uses four error bits for four data bits, which can correct 1-bit errors and detect 2-bit and 8-bit errors. This results in the transfer of 1200 bytes of information per video screen 110.

Due to limitations in frame rates of the portable device 106 and camera 108 in capturing images from the video screen 110, and also due to the computationally intensive processing of video, assume that only one frame of data can be captured by the camera 108 from the video screen 110 and decoded by the portable device 106 every second. This results in an effective transfer rate of 1200 bytes/second or 9600 baud.

Figure 2:
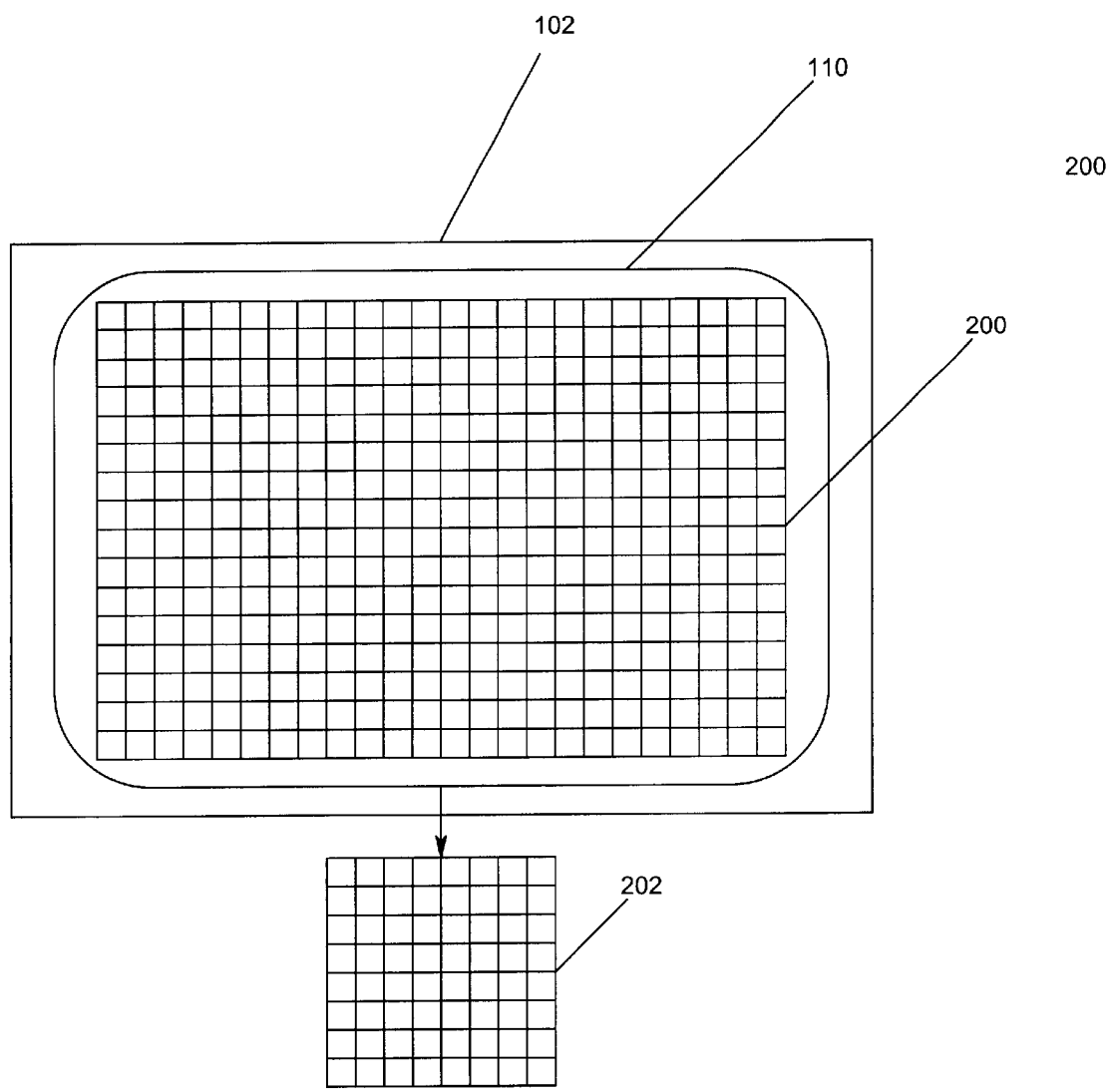
FIG. 2 illustrates the display of data elements on a video screen according to the preferred embodiment of the present invention.

Thus, colored boxes of 8×8 pixels in size could be used as a coding sequence to display the data on the video screen 110. This is illustrated in FIG. 2, although FIG. 2 is merely an example that illustrates the coding and display of a limited number of data elements 200 and does not necessarily comprise the full number of data elements or pixels that would be displayed on the video screen 110. Of course, any number of different coding sequences could be used without departing from the scope of the present invention.

The portable device 106 could downsync over the Web using any client computer 102, which sounds insecure but can be made secure by using encryption techniques. In one embodiment, the downsync method uses the Data Encryption Standard DES) encryption (with some key that was preconfigured by the user) for the video screen 110 data; while in another embodiment, the downsync method uses public-key encryption for the video screen 110 data. Of course, many types of encryption could be used to prevent snooping of the data transmitted by the video screen 110.

Performing the downsync via a web browser has numerous advantages. For example, such a technique allows the user to access any file on a server computer 104 securely and remotely from any client computer 102 that has Web access to the server computer 104 from anywhere in the world. This may be especially useful for email and scheduling, though there may be many other uses as well.

Figure 3:
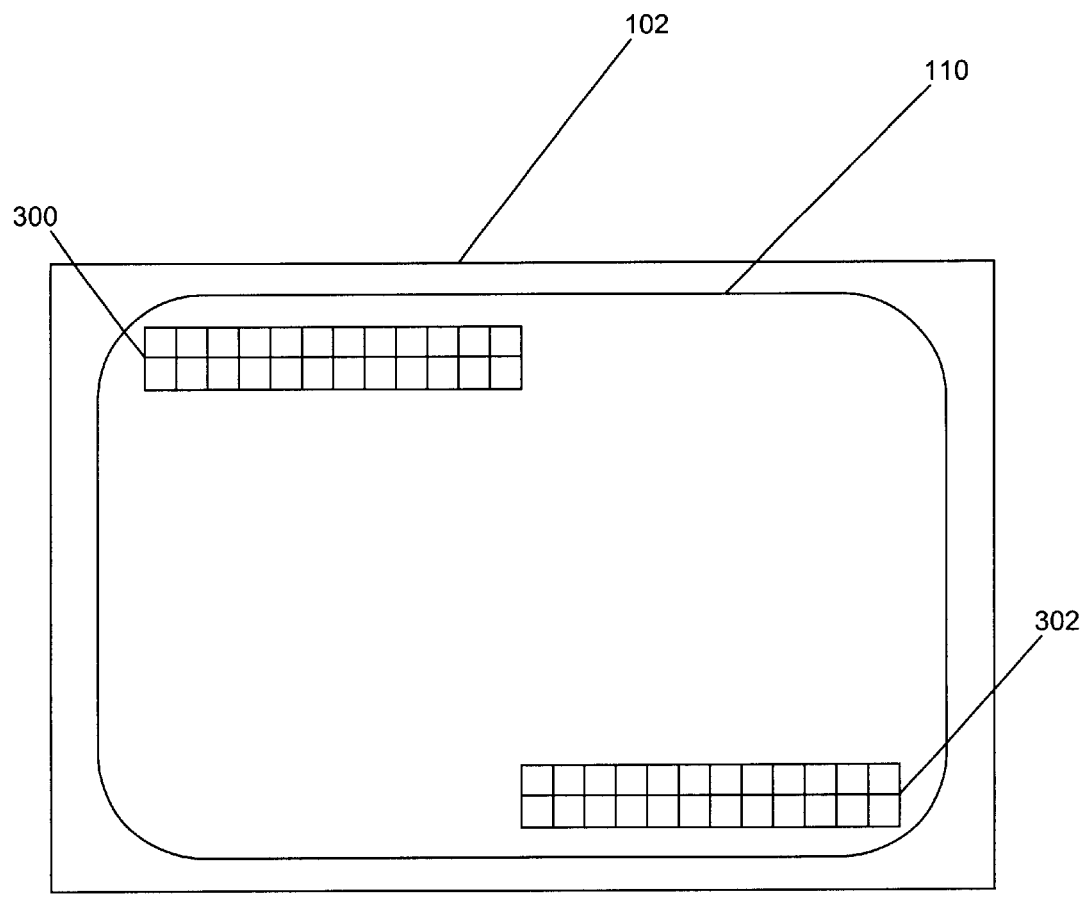
FIG. 3 illustrates the display of start-of-frame and end-of-frame data elements on a video screen according to the preferred embodiment of the present invention.

The downsync technique described herein, however, is not problem-free. One problem is for the portable device 106 to recognize when data has been displayed on the video screen 110 of the client computer 102. This can be addressed by using a start-of-frame sequence, e.g. a color sequence in the upper left corner of the video screen, and an end-of-frame sequence, e.g., a color sequence in the lower right corner of the video screen. This is illustrated in FIG. 3, although FIG. 3 is an example that merely illustrates the coding and display of an exemplary start-of-frame sequence 300 and end-of-frame sequence 302 and does not comprise the full number of data elements or pixels that would be displayed on the video screen 110. Of course, any number of different framing sequences could be used without departing from the scope of the present invention.

Depending on the distance of the digital camera 108 of the portable device 106 from the video screen 110 of the client computer 102 and the size of the video screen 110, the portable device 106 needs to know how many blocks of information are in a row on the video screen 110. The portable device 106 can deduce this information, for example, by using the upper-left and lower-right color sequences to determine the appropriate scaling factor.

Figure 4:
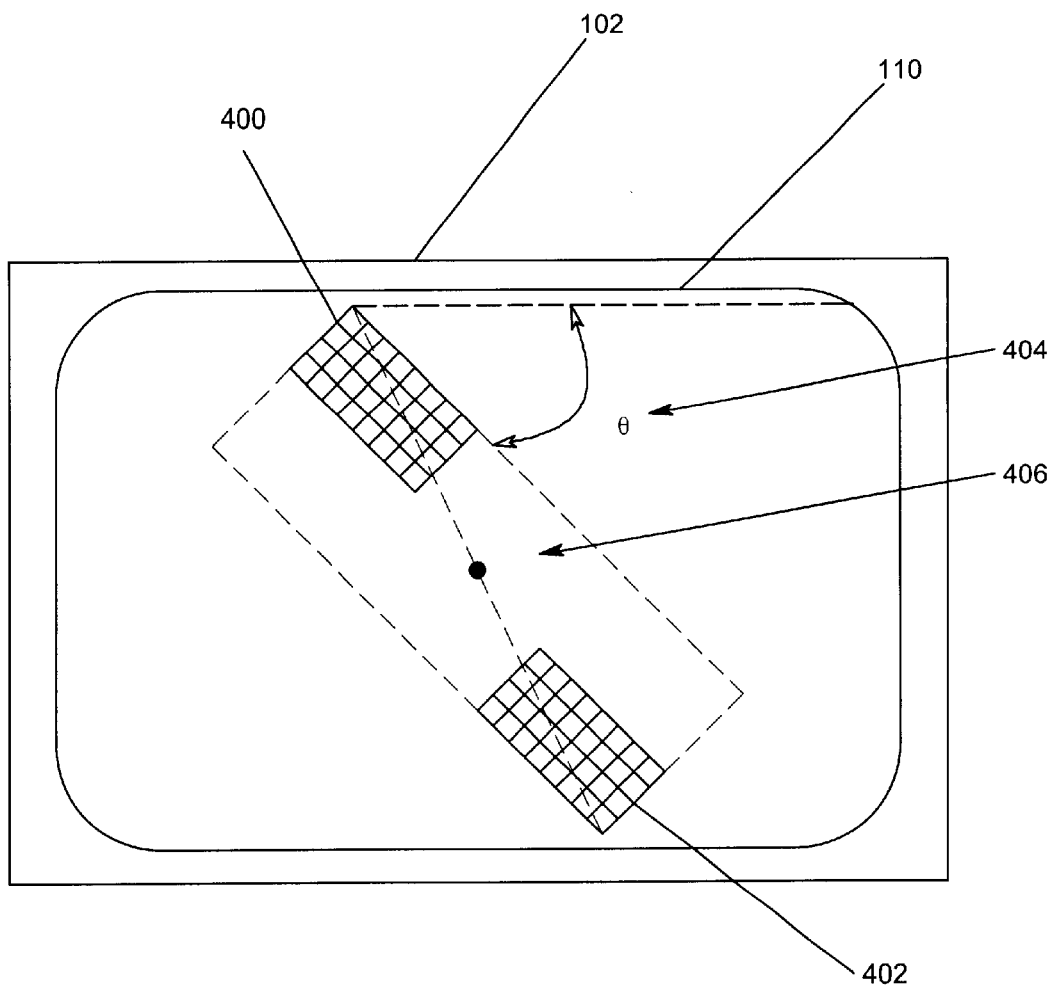
FIG. 4 illustrates the display of rotated data elements on a video screen according to the preferred embodiment of the present invention.

Imperfect alignment can be handled in several different ways. One solution, illustrated in the example of FIG. 4, would be to use the upper-left and lower-right color sequences, so that a rotation can be performed to get fairly good alignment. In such an embodiment, the following steps would be taken:

1. identify the upper left corner pattern 400,
2. identify the lower right corner pattern 402,
3. determine an angle θ 404 based on a line formed from the upper left corner pattern 400 to the lower right corner pattern 402,
4. rotate the image based on θ 404 using a midpoint 406 of the line formed from the upper left corner pattern 400 to the lower right corner pattern 402 as the center of rotation, and
5. crop the image, if necessary, so that the upper left corner pattern 400 and the lower right corner pattern 402 form the boundaries of the image.

Because some video screens 110 are curved, the portable device 106 also needs to use a method that is tolerant of errors. One method may be to start with a box in one position of the video screen 110, and then step it to the next adjacent estimated position, but slide it around a few pixels to find the best fit, and then compute the code value.

Logic of the Invention

Figure 5:
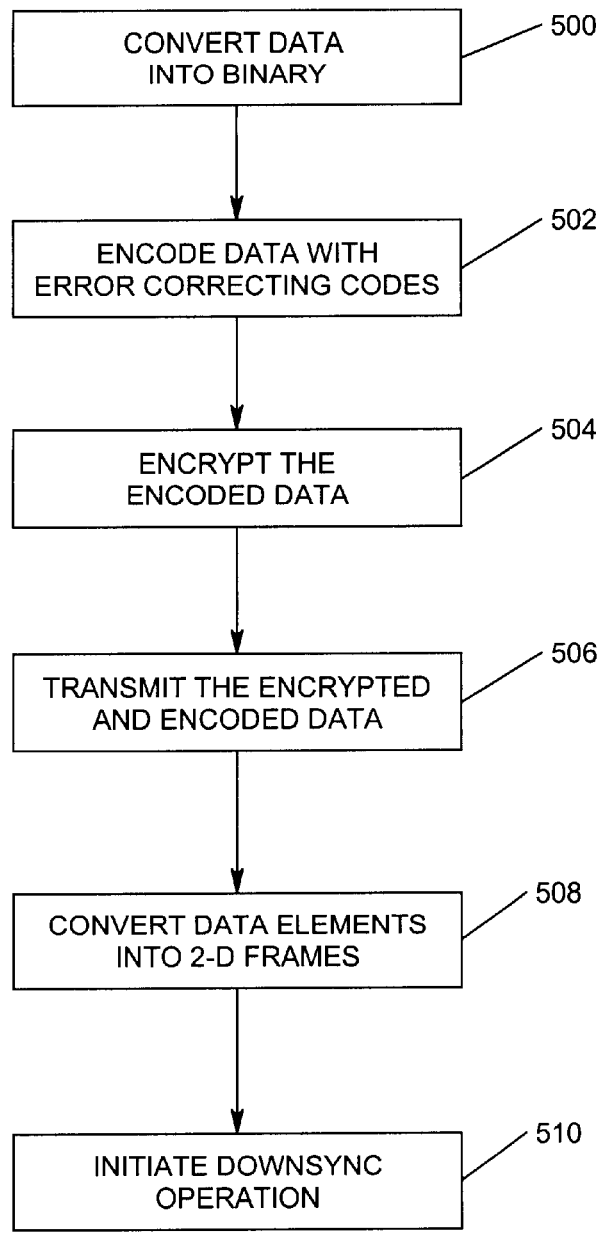
FIG. 5 is a flowchart that illustrates the general logic of the server and client computer when performing the steps according to the preferred embodiment of the present invention.
Figure 6:
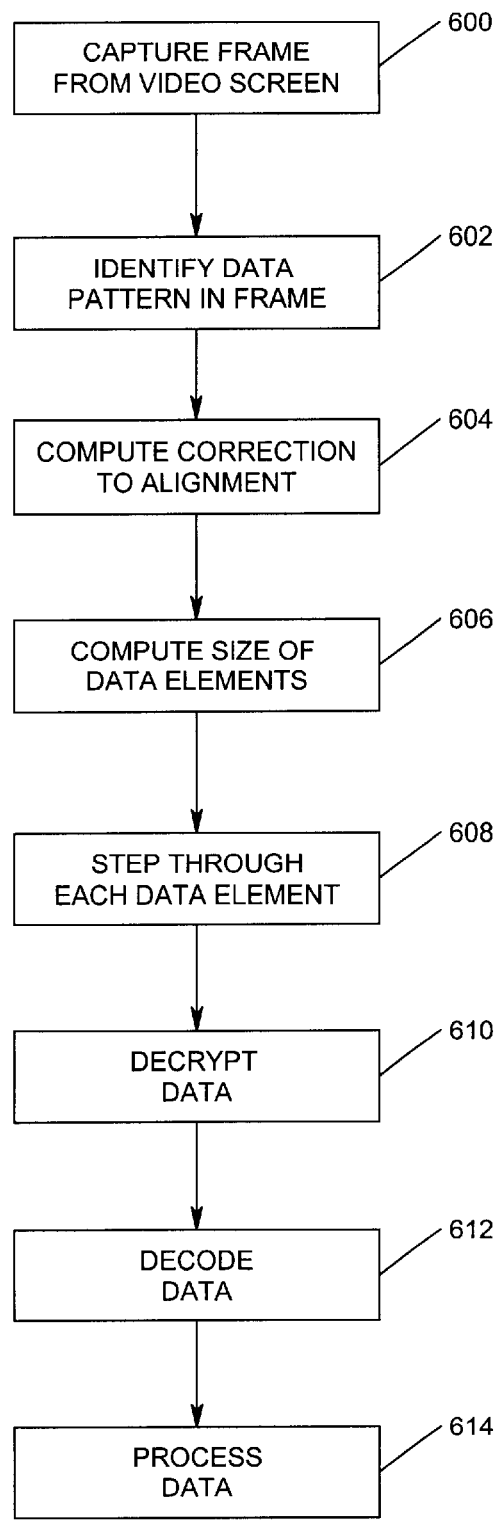
FIG. 6 is a flowchart that illustrates the general logic of the portable device when performing the steps according to the preferred embodiment of the present invention.

Flowcharts that illustrate the logic of the preferred embodiment of the present invention are shown in FIGS. 5 and 6. Those skilled in the art will recognize that this logic is provided for illustrative purposes only and that different logic may be used to accomplish the same results.

Server and Client Computer

FIG. 5 is a flowchart that illustrates the general logic of the server and client computer 102 when performing the steps according to the preferred embodiment of the present invention.

Block 500 represents the server computer 104 converting the data elements within the raw data into a binary representation (if necessary).

Block 502 represents the server computer 104 encoding the binary representation of the data elements with error-correcting code information.

Block 504 represents the server computer 104 encrypting the encoded binary representation of the data elements.

Block 506 represents the server computer 104 transmitting the encrypted and encoded binary representation of the data elements to the client computer 102.

Block 508 represents the client computer 102 converting the encrypted and encoded binary representation of the data elements into a sequence of two-dimensional frames using shapes of varying color to represent the data elements.

Block 510 represents the client computer 102, when the user initiates the operation of the downsync, displaying the sequence of two-dimensional frames one at a time on the video screen 110, so that the digital camera 108 of the portable device 106 can capture the displayed frames.

Portable Device

FIG. 6 is a flowchart that illustrates the general logic of the portable device 106 when performing the steps according to the preferred embodiment of the present invention.

Block 600 represents the portable device 106 capturing a frame from the video screen 110 via its digital camera 108.

Block 602 represents the portable device 106 identifying a data pattern within the captured frame by searching for the borders of the frame.

Block 604 represents the portable device 106 computing an alignment correction for the captured frame by searching for expected color sequences, and then rotating and shifting the frame so that it is properly aligned.

Block 606 represents the portable device 106 computing the size of the data elements based upon the width and height of the captured frame.

Block 608 represents the portable device 106 stepping through each data element of the captured frame, and then converting the data element into a binary form.

Block 610 represents the portable device 106 decrypting the binary form of each data element of the captured frame.

Block 612 represents the portable device 106 decoding the binary form of each data element of the captured frame using the error-correcting codes.

Finally, Block 614 represents the portable device 106 processing the binary form of each data element of the captured frame.

CONCLUSION

This concludes the description of the preferred embodiment of the invention. The following describes some alternative embodiments for accomplishing the present invention.

For example, any combination of devices could be used to implement the present invention. Moreover, these devices can take many different forms and configurations. In addition, any type of computer configuration and/or network configuration could benefit from the present invention.

In summary, the present invention discloses a system for synchronizing data between two devices. A first device displays a data stream as a sequence of one or more two-dimensional frames on a video screen attached thereto, wherein each of the two-dimensional frames is comprised of at least one two-dimensional shape of varying color that represents at least one data element within the data stream. A second device having an image sensing device coupled thereto captures images from the displayed sequence of two-dimensional frames and for decodes the data elements from the captured images.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A system for synchronizing data between two devices, comprising:

(a) a first device for displaying a data stream as a sequence of one or more two-dimensional frames on a video screen attached thereto, wherein each of the two-dimensional frames is comprised of at least one two-dimensional shape that represents at least one data element within the data stream; and (b) a second device having an image sensing device coupled thereto for capturing two-dimensional images from the displayed data stream using the image sensing device and for decoding the data elements from the captured two-dimensional images.

2. The system of claim 1, wherein the sequence of two-dimensional frames is displayed by a web browser.

3. The system of claim 1, wherein the sequence of two-dimensional frames is displayed by a standalone program.

4. The system of claim 1, wherein each of the two-dimensional frames is comprised of start-of-frame and end-of-frame sequences.

5. The system of claim 1, wherein the first device displays the sequence of two-dimensional frames one at a time on the video screen.

6. The system of claim 1, wherein the data elements are encoded for error correction prior to being displayed.

7. The system of claim 1, wherein the data elements are encrypted for security prior to being displayed.

8. The system of claim 1, wherein the colors are extremes in value.

9. The system of claim 1, wherein the first device is connected to a network and the data stream is generated from data stored on the network.

10. The system of claim 1, wherein the second device identifies a pattern of data elements within the captured two-dimensional image by searching for a border of the frame.

11. The system of claim 1, wherein the second device determines a scaling factor for the captured two-dimensional image from the identified pattern of data elements.

12. The system of claim 1, wherein the second device computes an alignment correction for the captured two-dimensional image by searching for expected color sequences in the frame, and then rotating and shifting the captured two-dimensional image so that it is properly aligned.

13. The system of claim 1, wherein the second device computes a size for the data elements based upon a width and height of the frame identified in the captured two-dimensional image.

14. The system of claim 1, wherein the second device corrects for a curvature of the video screen based upon the frame identified in the captured two-dimensional image.

15. A portable digital device, comprising:

(a) a processor having an image sensing device coupled thereto; and (b) means, performed by the processor, for capturing at least one two-dimensional image from a sequence of one or more two-dimensional frames displayed on a video screen using the image sensing device, wherein each of the two-dimensional frames is comprised of at least one two-dimensional shape that represents at least one data element within a data stream, and for decoding the data elements from the captured two-dimensional image.

16. The system of claim 15, wherein each of the two-dimensional frames is comprised of start-of-frame and end-of-frame sequences.

17. The system of claim 15, wherein the sequence of two-dimensional frames are displayed one at a time on the video screen.

18. The system of claim 15, wherein the data elements are encoded for error correction prior to being displayed.

19. The system of claim 15, wherein the data elements are encrypted for security prior to being displayed.

20. The system of claim 15, wherein the colors are extremes in value.

21. The system of claim 15, wherein the data stream is generated from data stored on a network.

22. The system of claim 15, further comprising means for identifying a pattern of data elements within the captured two-dimensional image by searching for a border of the frame.

23. The system of claim 15, further comprising means for determining a scaling factor for the captured two-dimensional image from the identified pattern of data elements.

24. The system of claim 15, further comprising means for computing an alignment correction for the captured two-dimensional image by searching for expected color sequences in the frame, and then rotating and shifting the captured two-dimensional image so that it is properly aligned.

25. The system of claim 15, further comprising means for computing a size for the data elements based upon a width and height of the frame identified in the captured two-dimensional image.

26. The system of claim 15, further comprising means for correcting for a curvature of a video screen based upon a frame identified in the captured two-dimensional image.

27. A digital display system, comprising:

(a) a processor having a video screen coupled thereto; and (b) means, performed by the processor, for displaying a data stream as a sequence of one or more two-dimensional frames on the video screen, wherein each of the two-dimensional frames is comprised of at least one two-dimensional shape that represents at least one data element within the data stream, at least one two-dimensional image is captured from the displayed data stream by an image sensing device coupled to a second device, and the data elements are decoded from the at least one captured two-dimensional image by the second device.

28. The system of claim 27, wherein the sequence of two-dimensional frames is displayed by a web browser.

29. The system of claim 27, wherein each of the two-dimensional frames is comprised of start-of-frame and end-of-frame sequences.

30. The system of claim 27, wherein the sequence of two-dimensional frames are displayed one at a time on the video screen.

31. The system of claim 27, wherein the data elements are encoded for error correction prior to being displayed.

32. The system of claim 27, wherein the data elements are encrypted for security prior to being displayed.

33. The system of claim 27, wherein the colors are extremes in value.

34. The system of claim 27, wherein the processor is connected to a network and the data stream is generated from data stored on the network.

* * * * *